United States Patent [19]

Raven

[11] 4,244,036
[45] Jan. 6, 1981

[54] ELECTRONIC STABILIZATION FOR DISPLACED PHASE CENTER SYSTEMS

[75] Inventor: Robert S. Raven, Catonsville, Md.

[73] Assignee: Westinghouse Electric Corp., Pittsburgh, Pa.

[21] Appl. No.: 972,166

[22] Filed: Dec. 21, 1978

[51] Int. Cl.³ .................. G01S 15/89; G01S 13/90
[52] U.S. Cl. .................................. 367/88; 367/12; 343/5 CM
[58] Field of Search ............... 343/5 CM; 367/12, 88

[56] References Cited

U.S. PATENT DOCUMENTS 3,993,994  11/1976  Goggins ..................... 343/5 CM

FOREIGN PATENT DOCUMENTS 1454368  11/1976  United Kingdom ............... 343/5 CM Primary Examiner—Richard A. Farley
Attorney, Agent, or Firm—D. Schron

[57] ABSTRACT

In moving target indication or synthetic aperture systems, double pairs of measurements of returned energy are made from displaced spatial locations to enable computation of side and angular deviation from the flight path, without the requirement for inertial navigational measuring instruments.

9 Claims, 17 Drawing Figures

ELECTRONIC STABILIZATION FOR DISPLACED PHASE CENTER SYSTEMS

BACKGROUND OF THE INVENTION

1. Field of the Invention

The invention, in general, relates to sensor systems wherein active elements are mounted on a moving platform or carrier, and particularly to a data correction arrangement therefor.

2. Description of the Prior Art

In coherent electromagnetic and acoustic sensing systems operated from moving vehicles, small perturbations of the vehicle from uniform motion produce degrading amplitude, phase, and frequency modulation of the received signal. In many applications, it is impractical to control the vehicle with sufficient accuracy and smoothness to maintain these disturbances below acceptable levels and means must be provided to measure them and remove their effects from the received signal. This measurement instrumentation includes rate gyros, position gyros, and accelerometers and is generally very complicated and generally requires extreme precision of measurement. For use in an underwater sonar system where, due to the relatively slower speed of propagation of acoustic waves compared to electromagnetic waves and/or due to the relatively slower speeds of ships and submarines compared to land vehicles and aircraft, an order of magnitude greater precision is required, and a question arises as to whether sufficient accuracy is even attainable.

Instrumentation equipment consisting of rate gyros, position gyros, and accelerometers with associated mountings, motors, and electronics and associated computing equipment providing inertial measurement of vehicle perturbations from uniform motion and removal of the effects of such motion from coherent electromagnetic and acoustic sensing systems operating from moving vehicles will be referred to hereinafter as motion compensation equipment.

A general class of electromagnetic and acoustic sensing systems which normally requires motion compensation equipment is synthetic aperture radar and sonar mapping systems. In such systems, very fine angular resolution for imaging or resolving reflecting objects is achieved by sequentially generating a long effective aperture along the vehicle motion path. In such systems, the physical aperture (an antenna for a radar system or a transducer for a sonar system) transmits and receives reflections periodically along the vehicle path which are stored and combined by data processing means. In such systems, in order to achieve accurate results, the carrier of the sensor should not deviate more than a small fraction of a wavelength from uniform motion or, more generally, from a precisely defined course. In actual practice, such a stringent requirement is usually impractical and accordingly, motion compensation equipment is utilized to determine carrier deviations and correct the received signals to compensate for the deviations.

A second general class of electromagnetic and acoustic sensing systems which may require motion compensation equipment is MTI (moving target indication) radar and sonar. In MTI radar and sonar, reflections from reflectors with radial motion relative to the carrier of the sensor are discriminated from reflections from terrain and fixed reflectors by virtue of the Doppler frequency shift of the former. In MTI systems, signals reflected from terrain and fixed reflectors are suppressed by a cancellation filter means which eliminates or reduces signals with little or no Doppler shift. One type of cancellation filter involves subtracting reflected signals received from sequential transmissions separated by a time interval sufficiently long to allow signals from moving reflectors with Doppler shifts to change significantly between these transmissions. In this two-signal type of MTI system, the difference between successive signals from fixed reflectors is then very small and such signals are cancelled while the difference from moving reflectors with Doppler shifts is appreciable; and this difference can be detected, displayed, or subjected to further signal processing means. In addition to MTI systems employing the two-signal cancellation filter described above, MTI systems and cancellation filter means may exist in a variety of alternative designs, utilizing more than two signals, employing feedback, and incorporating adaptive features, for example.

Perturbations of the carrier from uniform motion in MTI systems impose Doppler shifts on signals reflected from terrain and fixed reflectors which may degrade the effectiveness of the cancellation filter operation. In such cases, motion compensation equipment may be employed to correct the received signals and compensate for such motion perturbations. A further source of degradation in MTI systems operated from moving vehicles in Doppler shifts imposed on signals reflected from terrain and fixed reflectors due to the finite width of the illuminating beam. These Doppler shifts occur because components of the carrier's uniform motion are different for reflectors at different angles within the beam, and they cause the spectrum of signals reflected from terrain and fixed reflectors to have an appreciable width.

A design approach which has been employed to aid motion compensation equipment in SAR systems and to reduce MTI system degradation due to the motion induced Doppler spectrum width of the terrain return is the use of dual aperture displaced phase center principles. In a dual aperture displaced phase center radar or sonar, two receiving apertures are mounted on the carrier displaced from each other in the direction of uniform motion. One of the apertures may be used for transmission or a separate transmitting aperture may be employed. In a dual aperture displaced phase center radar or sonar, the period between two successive transmissions is adjusted so that the carrier movement between these transmissions is approximately equal to the displacement of the equivalent aperture centers (taking into account both transmission and reception), and by receiving sequentially on the forward and rear apertures, respectively, the effect of two transmissions and receptions from approximately a stationary point is achieved. Signals received from approximately a stationary point will have minimum Doppler shifts imposed on signals reflected from terrain and fixed reflectors due to the finite width of the beam; and thus this source of performance degradation in MTI radar and sonar is minimized. The phase difference between the successive signals received by a dual aperture displaced phase center radar or sonar will be sensitive to side motion (normal to the primary carrier motion and to the displacement of the two apertures) and to angular movement producing such side motions between transmissions. In MTI applications, these disturbances may degrade performance and may require independent measurement and compensation. In SAR system applications, the phase angle between successive signal receptions can be employed to yield a measurement of side motion which may be more accurate than that derived from inertial measuring instruments.

The present invention represents an extension of dual aperture displaced phase center principles to more than two displaced apertures and more than two transmissions and receptions, allowing the requirement for inertial measurement of side and angular motion to be relieved or eliminated in MTI applications and the relief or elimination of angular motion inertial measurements in SAR applications.

SUMMARY OF THE INVENTION

The apparatus of the present invention includes an array of linearly arranged active elements, with at least one of the elements being adapted to both transmit and receive energy. The array is mounted on a carrier and during travel of the carrier over a target area, energy is periodically transmitted, and in response to return reflected energy for each transmission at least first and second signals corresponding to first and second spatial samples along the path of travel, are derived. These signals from one transmission nominally occupy the same location in space as the first and second signals from a subsequent transmission but are subject to relatively lateral and angular deviation. Means are provided for comparing the signals from the first transmission with the signals from a subsequent transmission to generate lateral and angular correction signals which may then be utilized for stabilizing the data of a synthetic aperture or MTI system, for example.

DESCRIPTION OF THE PREFERRED EMBODIMENTS

Figure 1:
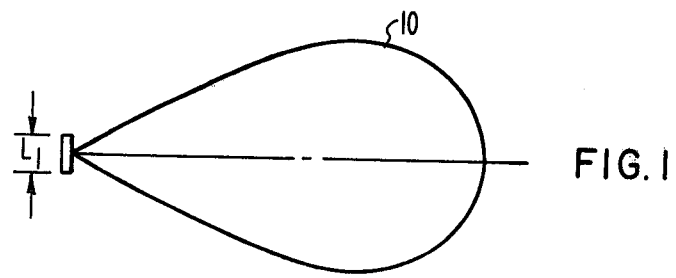
FIG. 1 illustrates a beam pattern obtained with an antenna of length $L_1$.

FIG. 1 illustrates the beam pattern 10 obtained with an antenna of length $L_1$. The beam width $\beta$ is given by the relationship:

$$\beta = \lambda/L$$

where $\lambda$ is the wavelength of the energy transmitted and/or received, and L is the length of the antenna.

Figure 2:
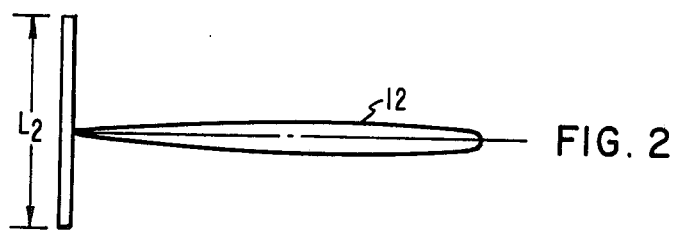
FIG. 2 illustrates the beam pattern obtained with a relatively longer antenna of length $L_2$.

In accordance with the above formula, as the length of the antenna increases, the beam width decreases and this situation is illustrated in FIG. 2 wherein the relatively narrower beam 12 is provided by the relatively longer antenna of length $L_2$.

Figure 3:
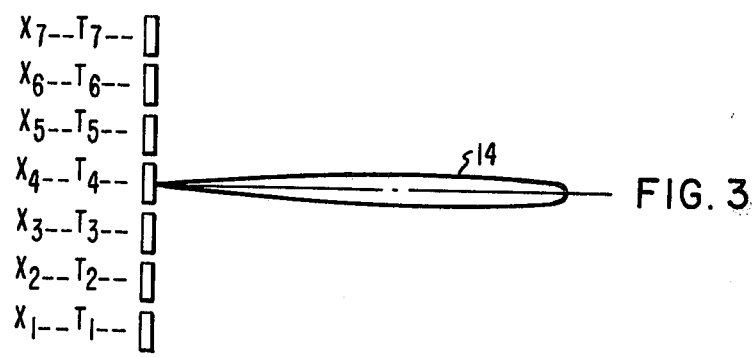
FIG. 3 illustrates a synthetic aperture beam.

In a synthetic aperture system, a relatively narrow beam as illustrated in FIG. 2 is obtained with a relatively short antenna as in FIG. 1. The principle is as illustrated in FIG. 3 wherein the relatively short antenna is illustrated at position $X_1$ at time $T_1$ and for subsequent positions at subsequent points in time. Let it be assumed that the length of the antenna of FIG. 3 is $L_1$. By storing the received signals from each of the transmissions at times $T_1$ through $T_7$ at corresponding locations $X_1$ through $X_7$, and coherently adding the stored signals, the antenna of FIG. 2 is simulated thereby resulting in the narrow beam 14 illustrated in FIG. 3.

Figure 4:
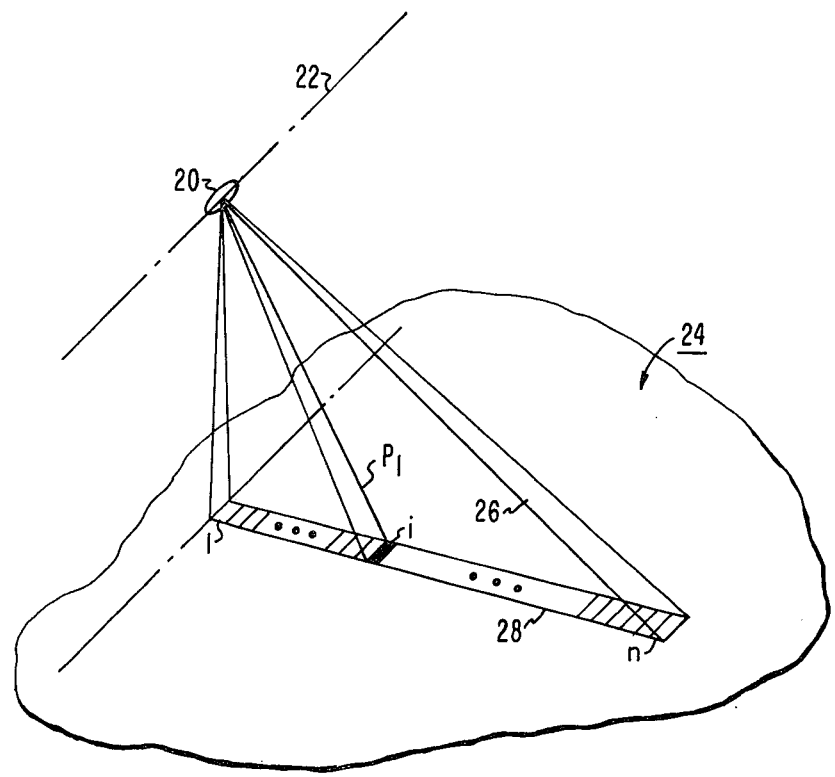
FIG. 4 illustrates a carrier vehicle as it passes over a target area and further illustrates the area examined by a synthetic aperture beam.

FIG. 4 illustrates a carrier 20 proceeding along a flight path 22 over a target area 24. Energy of interest is contained in volume 26 and in operation returns from range cells 1 through n from a relatively narrow strip 28 on the target area are processed and displayed. FIG. 4 illustrates an instant of time wherein range cell i is being examined by the equipment, and $P_i$ designates a plane emanating from the equipment aboard the carrier vehicle and intersecting the middle of the $i^{th}$ range cell. As the carrier vehicle 20 proceeds over the target area, multiple transmissions take place so that information from adjacent narrow strips is processed and displayed resulting in an energy map of the target area.

Figure 5:
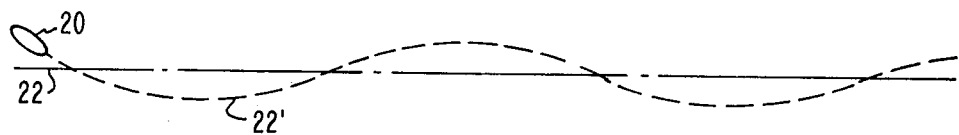
FIG. 5 illustrates the deviation from an actual flight path.

FIG. 5 is a plan view of the desired flight path 22 of FIG. 4 and illustrates that the carrier vehicle 20 is actuality does not exactly follow the flight path 22 but may deviate therefrom as illustrated by flight path 22'. Since the data must be processed on the basis of a straight flight path 22, inertial navigational elements are utilized to measure deviations from the prescribed course and these measured deviations are utilized to generate correction signals for the processed data.

Inertial stabilization elements must also be utilized in airborne moving target detection radar to eliminate or reduce the Doppler spread of ground return due to carrier motion. Many such systems utilize displaced phase center configurations which are very sensitive to lateral or angular motion of the antenna structure between transmission-receptions of energy. The displaced phase center operation may be described with reference to FIGS. 6, 7 and 8.

Figure 6:
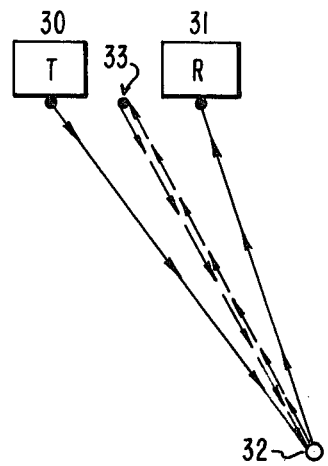
FIG. 6 shows two active elements and illustrates the principle of an equivalent spatial sample location.

In FIG. 6, two active elements 30 and 31 are illustrated, with an active element as utilized herein being a radiating and/or receiving element such as an antenna for electromagnetic energy or a transducer element of a line array for acoustic energy. Each element of designated length is also known as an aperture. It is well known that transmission and reception by two displaced apertures is closely approximated 30 will impinge upon reflector 32 and return energy will be picked up by the receiver element 31. This operation is equivalent to a transmission and subsequent reception of energy at point 33 half way between elements 30 and 31. Point 33 is known as an equivalent spatial sample location.

Figure 7:
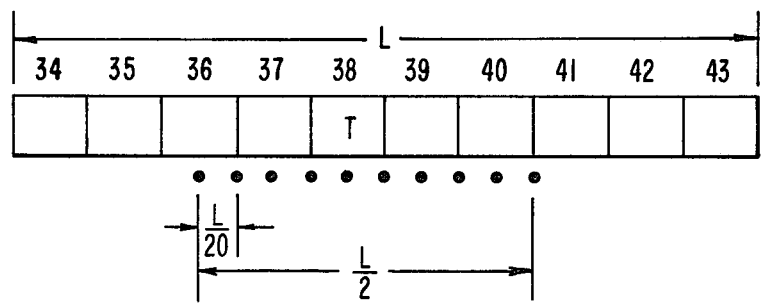
FIG. 7 illustrates an array of elements together with equivalent spatial sample locations.

FIG. 7 illustrates a linear array of elements 34 through 43 with the structure being of length L. Let it be assumed that element 38 constitutes a transmitting element while elements 34 through 43 constitute receiving elements. The situation in FIG. 7 is equivalent to separate transmissions from fictitious phase centers half way between the transmit location and the receive locations. These fictitious phase centers or equivalent spatial sample locations are illustrated by the black dots occupying a total length of L/2 with the distance between each sample location being L/20. If the carrier vehicle moves a distance of L/2 between pulses there is a continuous set of spatial samples available. Thus resolution of L/20, the sample separation can be achieved while the vehicle moves L/2 between pulses.

Figure 8:
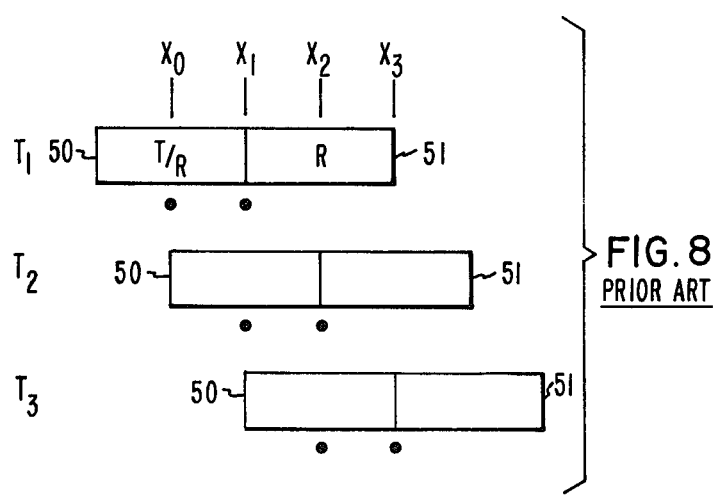
FIG. 8 shows a dual element antenna of the prior art to demonstrate the principle of displaced phase centers.

FIG. 8 illustrates the principle of displaced phase center to a moving target detection system. A pair of antenna elements 50 and 51 is illustrated with element 50 constituting both a transmit and receive element with element 51 constituting only a receive element. FIG. 8 illustrates the array for three transmission/reception times $T_1$, $T_2$, and $T_3$ and for clarity the antenna structures are shown one below the other although it is to be understood that the structures are actually proceeding in a straight line. For reference, distances $X_0$ through $X_3$ are illustrated. At time $T_1$ a transmission and reception takes place such that spatial samples, as indicated by the black dots, are provided at points $X_0$ and $X_1$. The distance between each location is equal to one-half the length of an element. After the next transmission/reception, as illustrated at $T_2$, a second pair of spatial samples is obtained for points $X_1$ and $X_2$ and it is seen that two samples from the same location in space, point $X_1$, is obtained from two different returns displaced in time. Having this information, the system may then cancel out non-moving targets (since the returns for non-moving targets will be identical). At time $T_3$ a subsequent transmission/reception yields spatial samples at points $X_2$, $X_3$ again yielding at point $X_2$, two more returns which may be compared.

Figure 9:
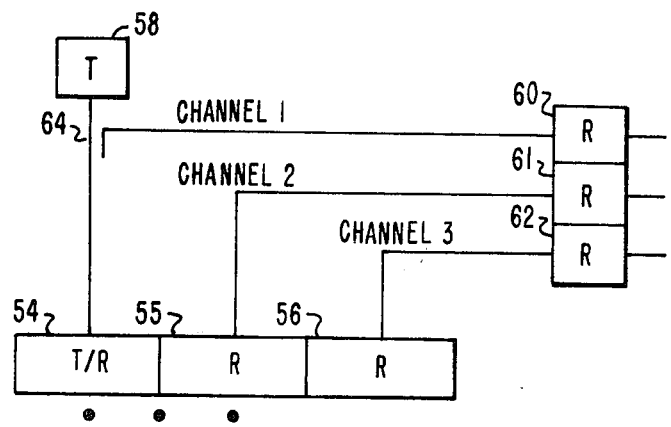
FIG. 9 illustrates an embodiment of the present invention showing equivalent spatial sample locations.
Figure 10:
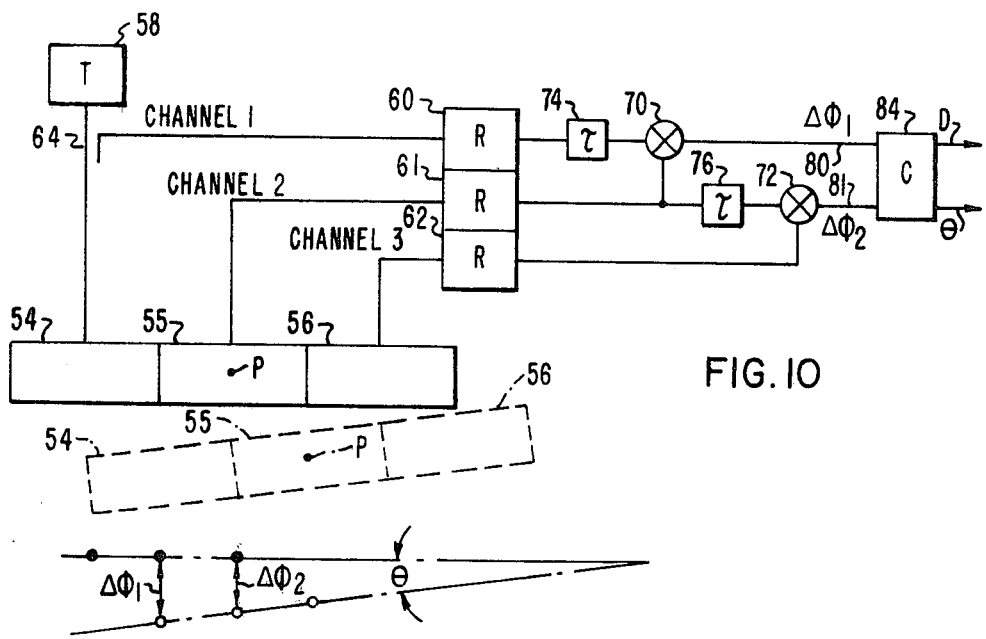
FIG. 10 is an embodiment, as in FIG. 9, additionally showing the equivalent spatial sample locations for a subsequent transmission and the means for obtaining certain correction signals.

The operation as illustrated in FIG. 8 is very sensitive to lateral and angular deviation of the antenna structure and requires inertial navigational instrumentation for measuring the deviation so that corrections may be applied to provide for correct readings. With the present invention, the requirement for these inertial measuring systems is eliminated by generating motion compensation signals derived wholly from the received signals themselves. For example, FIG. 9 illustrates three elements 54, 55 and 56 with element 54 additionally constituting a transmitting element. Transmitter 58 supplies element 54 with a pulse of energy to be transmitted and return energy is picked up by all of the elements and provided, in respective signal processing channels, to respective receivers 60 through 62, the return energy provided by element 54 being coupled to receiver 60 through TR switch 64. The arrangement is such that three spatial samples, illustrated by the black dots below the elements, are available. In FIG. 10, the dotted elements, 54, 55 and 56 show the position of the array for the next transmission/reception and it is seen that the array has advanced a distance of one-half an element length but in so doing has been moved laterally and angularly relative to its position on the prior transmission. The three equivalent spatial samples are illustrated by the white dots and it is seen that for the chosen advance between transmissions, there is an overlap of two samples. Had the structure not deviated from its linear path, the two samples (the second and third) from the first transmission would occupy the same location in space as the two samples (the first and second) from the subsequent transmission. The lateral deviation of the sampled pairs may be expressed as an equivalent phase difference in the received signals, with the phase differences being designated $\Delta\phi_1$ and $\Delta\phi_2$. From geometrical considerations, it may be demonstrated that the lateral displacement D of the center of the array P may be given by the formula:

$$D = \frac{(2\Delta\phi_2 - \Delta\phi_1)\lambda}{4\pi} \quad (1)$$

The angular deviation $\phi$ may be expressed as:

$$\theta = \frac{(\Delta\phi_1 - \Delta\phi_2)6\lambda}{4\pi L} \quad (2)$$

The lateral deviation is the deviation in a certain plane, such as plane $P_1$ of FIG. 4. With modern day digital signal processing circuitry, the deviations for each range cell may be calculated independently.

Figure 10A:
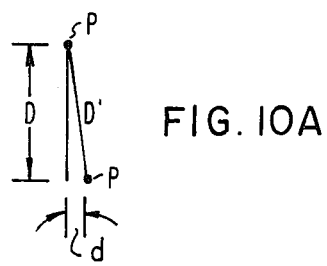
FIG. 10A illustrates the actual relative positioning of two spatial samples of two different transmissions.

The center of the array structure is designated by point P and FIG. 10A illustrates the lateral displacement D. The upper point P is the center of the array for a first transmission while the lower point P is the center for the subsequent transmission. Due to the angular deviation $\theta$; the lower point P is displaced somewhat by an amount d; however $D \approx D'$ for the small angle involved.

The differential phase angles $\Delta\phi_1$ and $\Delta\phi_2$ are determined by synchronous detection of the signal in channel 1, delayed by the interpulse period, with the signal in channel 2, and the signal in channel 2, delayed by the interpulse period, with the signal in channel 3. Accordingly, to accomplish this signal processing, there is provided synchronous detectors 70 and 72 together with delays 74 and 76 connected in respective first and second channels, with each synchronous detector providing an output signal proportional to the phase difference of its two input signals. It is seen that the signal in channel 1 as provided by receiver 60 is delayed for one interpulse period by delay 74 and is thereafter synchronously detected with the output of receiver 61 from the second transmission yielding the valve $\Delta\phi_1$ on output line 80. The output signal from receiver 61 is itself delayed for one interpulse period by delay 76 and is synchronously detected with the signal provided by receiver 62 to yield the value $\Delta\phi_2$ on output line 81. Having these values $\Delta\phi_1$ and $\Delta\phi_2$, the lateral deviation D and angular deviation $\theta$ may be computed in accordance with equations (1) and (2) for the generation of correction signals such as by computer 84.

Figures 11, 12:
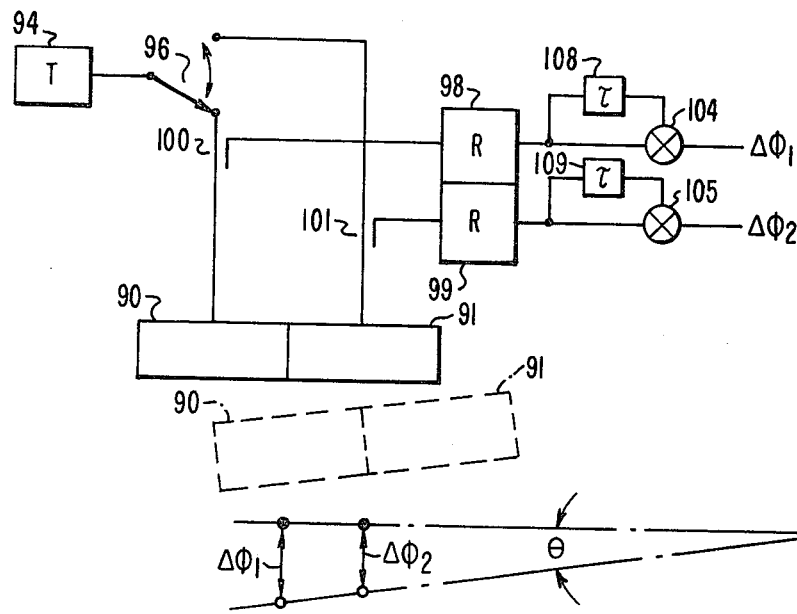
FIG. 11 is another embodiment of the present invention utilizing two active elements to obtain correction signals.
FIG. 12 serves to illustrate the operation of the apparatus of FIG. 11.

An alternate two-pulse configuration can be obtained with only two active elements if the transmitter is alternately switched between elements. Such configuration is illustrated in FIG. 11. Active elements 90 and 91 are both connected to transmitter 94 through switch means 96 operable to switch between elements on alternate transmissions. The output signals from elements 90 and 91 are provided to receivers 98 and 99 through respective TR switches 100, 101.

On a first transmission, element 91 is caused to transmit a pulse of energy whereupon two spatial samples, illustrated as black dots are obtained. When the array have traveled one-half an element length, switch means 96 causes element 90 to transmit thus providing a second pair of spatial samples indicated by the white dots. The position of the element array for the second transmission is shown dotted and it is seen that it has both lateral and angular deviations. For the arrangement illustrated in FIG. 11, it may be shown that the side displacement D may be defined by:

$$D = \frac{\Delta\phi_2 \lambda}{4\pi} \quad (3)$$

and the angular deviation given by:

$$\theta = \frac{(\Delta\phi_2 - \Delta\phi_1)4\lambda}{4\pi L} \quad (4)$$

For the configuration of FIG. 11, differential phases at the two sample locations are obtained by synchronous detection of the two receiver channels with themselves delayed by the interpulse period. Accordingly, there is provided synchronous detectors 104 and 105 together with delays 108 and 109 to accomplish derivation of the values $\Delta\phi_1$ and $\Delta\phi_2$.

With the arrangement of FIG. 11, comparisons are made with every pulse pair skipping the third pulse. Thus the arrangement is not suitable for a continuing comparison operation where motions are measured between every pulse. For example and with reference to FIG. 12, it is seen that on a first pulse at time $T_1$ two spatial samples are provided at positions $X_1$ and $X_2$. After the next pulse at time $T_2$, a second pair of samples is also provided at those same locations $X_1$ and $X_2$. Due to the nature of the operation, however, for pulse time $T_3$, no comparisons can be made with the spatial samples at points $X_3$ and $X_4$. The comparison however, can be made at the next pulse time $T_4$, with he provision of the two spatial samples also at positions $X_3$ and $X_4$. Again on the subsequent pulse at time $T_5$ no comparison can be made and at time $T_6$ the spatial samples are again available for a comparison. Although lateral and angular deviations are not measured between every pulse, this mode of operation may be quite satisfactory for various intended purposes.

Figure 13:
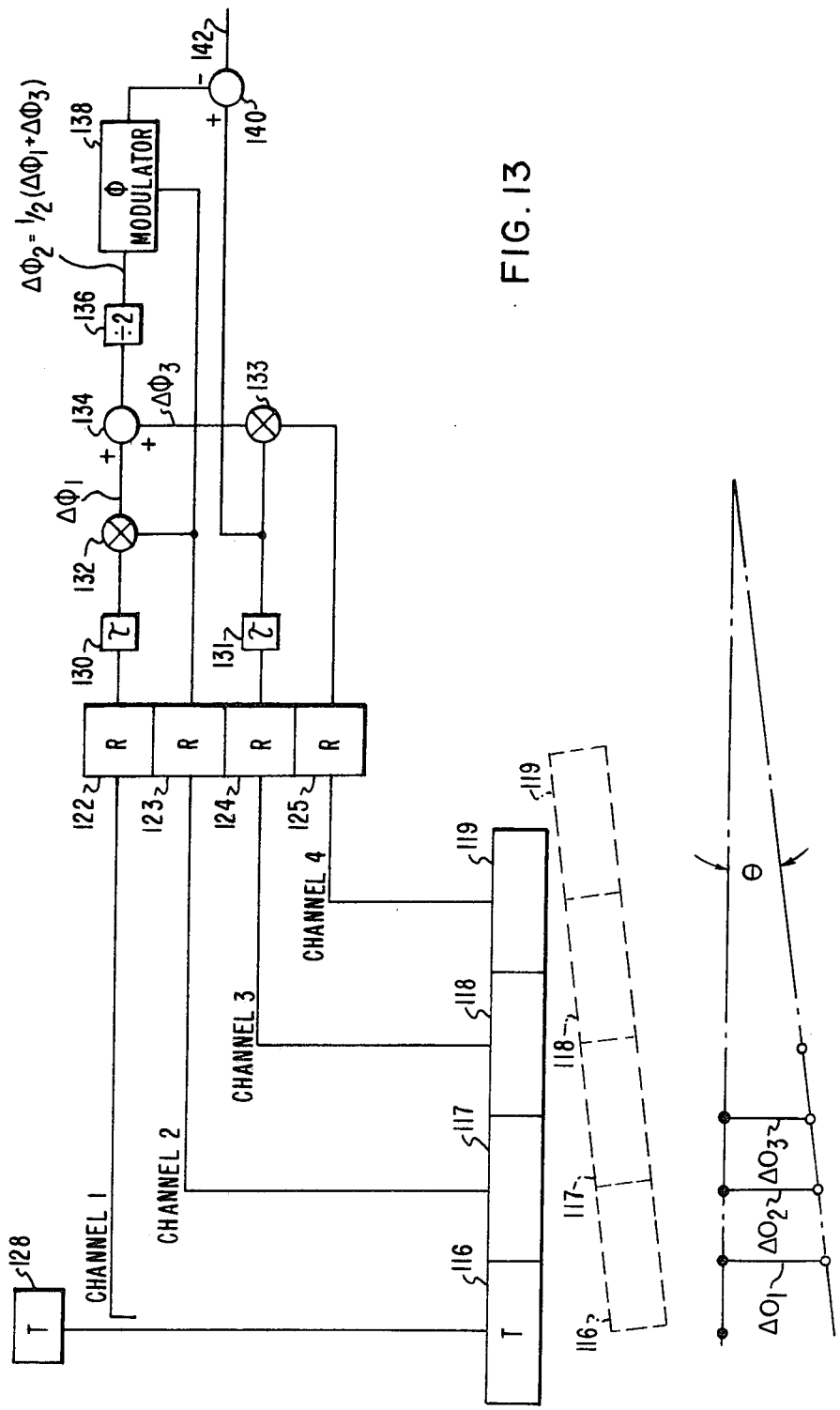
FIG. 13 is another embodiment of the present invention which additionally allows for ground return cancellation in an MTI radar or sonar system.

FIG. 13 illustrates an embodiment of the present invention wherein clutter cancellation in an MTI radar or sonar may be accomplished. To accomplish this task, the apparatus of FIG. 13 includes four active elements 116 through 119 each providing output signals to respective receivers 122 through 125 with element 116 additionally acting as the transmitting element by virtue of its connection to transmitter 128. Four spatial samples, as depicted by the black dots are obtained as a result of a first transmission, and a second set of four spatial samples as evidenced by the white dots is obtained with the subsequent transmission, the array of elements having moved to the position shown dotted.

The circuitry of FIG. 13 includes delay circuits 130 and 131 in the first and third channels, followed by synchronous detectors 132 and 133 respectively. The first channel additionally includes an adder 134, the output of which is connected to divide by two circuit 136. The first channel additionally includes a phase modulator 138 the output of which is connected to another adder 140 having as an additional input, the signal in the third channel delayed by delay 131. Basically, $\Delta\phi_1$ and $\Delta\phi_3$ are determined by synchronous demodulation of the first and third channels delayed by the signals in the second and fourth channels respectively such that the output of synchronous demodulator 132 is $\Delta\phi_1$ and the output of synchronous demodulator 133 is $\Delta\phi_3$. The value of $\Delta\phi_2$ is computed from these two latter signals by means of adder 134 and divider 136, the output signal of which is the calculated valued $$\Delta\phi_2 = \frac{\Delta\phi_1 + \Delta\phi_3}{2}.$$

The phase modulator 138 is a circuit which subtracts the phases of the two input signals provided to it, that is, the calculated value of $\Delta\phi_2$ and the signal in channel 2. The resulting value is subtracted, in adder 140, from the signal in channel 3 delayed by delay 131 to yield a cancelled output on output line 142. That is, the spatial sample in the third position of the first transmission should be identical to the spatial sample in the second position of the second transmission in the absence of any moving target. The spatial samples, however, will not be identical if the antenna array is subject to lateral or angular deviation. The arrangement of FIG. 13 provides the necessary signal processing such that the final output signal on line 142 is in itself a signal corrected for any deviations and is indicative of moving targets within the field of view of the element array.

Figure 14:
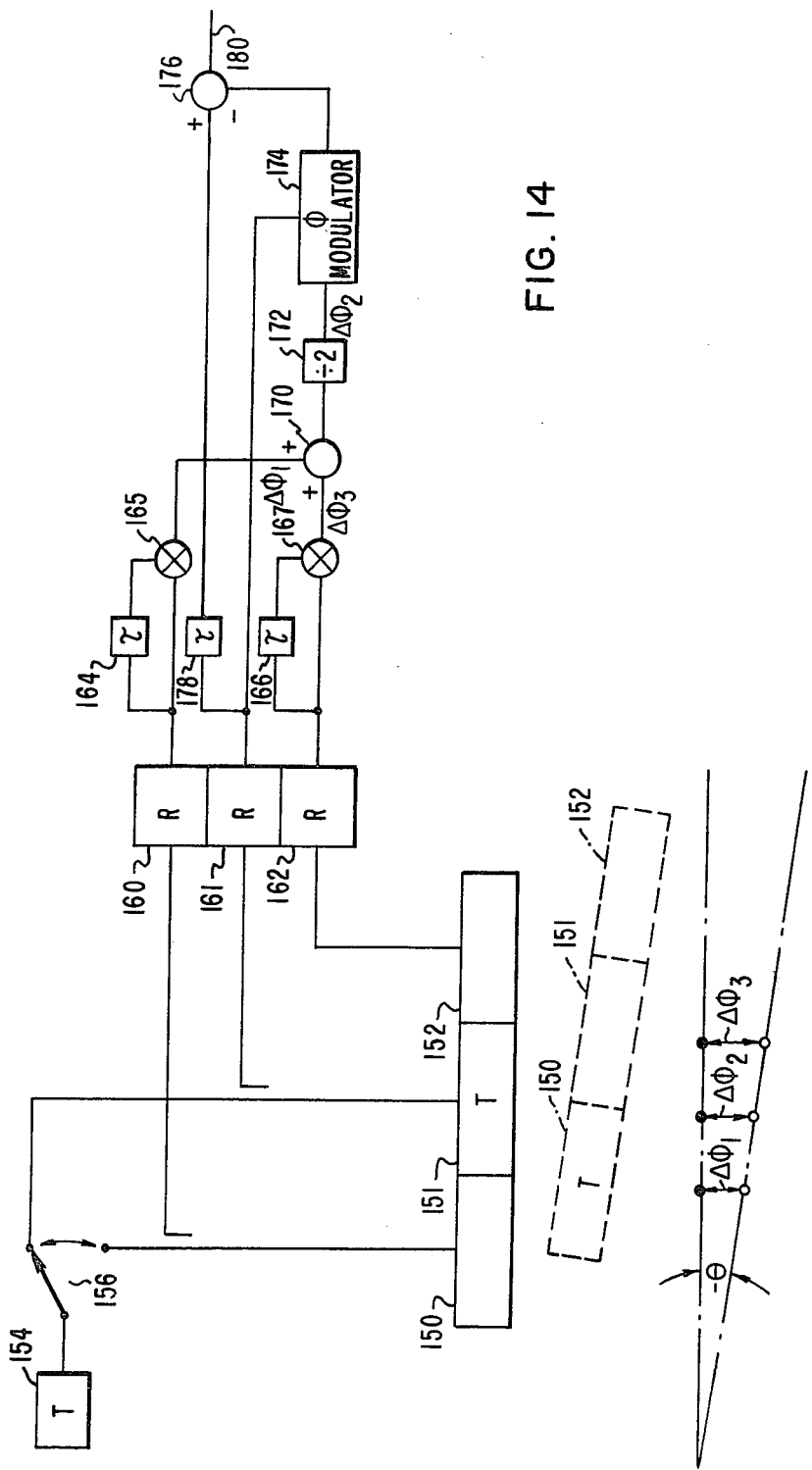
FIG. 14 is an embodiment of the invention for performing the same function as that embodiment in FIG. 13, however, with one less active element.

The cancellation process as described in FIG. 13 may also be accomplished with one less element by switching the transmitter between two elements on successive pulses. This arrangement is illustrated in FIG. 14 which includes the three elements 150 through 152 with element 150 and 151 being alternately connected to transmitter 154 by means of switch 156. The signal processing channels connected to the outputs of the element include respective receivers 160 through 162 with one pulse period delay 164 and synchronous detector 165 being connected in the first channel and one pulse period delay 166 and synchronous detector 167 being connected in the third channel. The outputs of synchronous detectors 165 and 167 are provided to adder 170 which feeds its output to a divide-by-two circuit 172. Phase modulator 174 is provided with the output of receiver 161 and the output of the divide-by-two circuit 172 to in turn provide an output signal to adder 176 which also receives the channel 2 signal delayed by one pulse period by delay circuit 178.

The switching arrangement is such that on a first pulse the middle element 151 will transmit to provide three spatial samples as indicated by the black dots. On the next pulse, element 150 transmits to provide the three spatial samples as indicated by the white dots. It is to be noted that in its new position, the array of elements is displaced so that $\theta$ is negative in comparison with the positive displacement indicated in FIG. 13.

The circuitry is operable such that the differential phases $\Delta\phi_1$ and $\Delta\phi_3$ are obtained by synchronous detection of the signals in channels 1 and 3, with themselves delayed. Adder 170 provides a resultant value equal to the summation of $\Delta\phi_1$ and $\Delta\phi_3$ and the output of circuit 172 provides the average, or $\Delta\phi_2$. This $\Delta\phi_2$ signal phase modulates the channel 2 signal which is subtracted, in adder 176, to provide the cancelled output on output line 180. As was the case with the respect to the apparatus of FIG. 11, the apparatus of FIG. 14 will provide cancellation in pulse pairs with an intermediate transmission not providing for cancellation.

Figure 15:
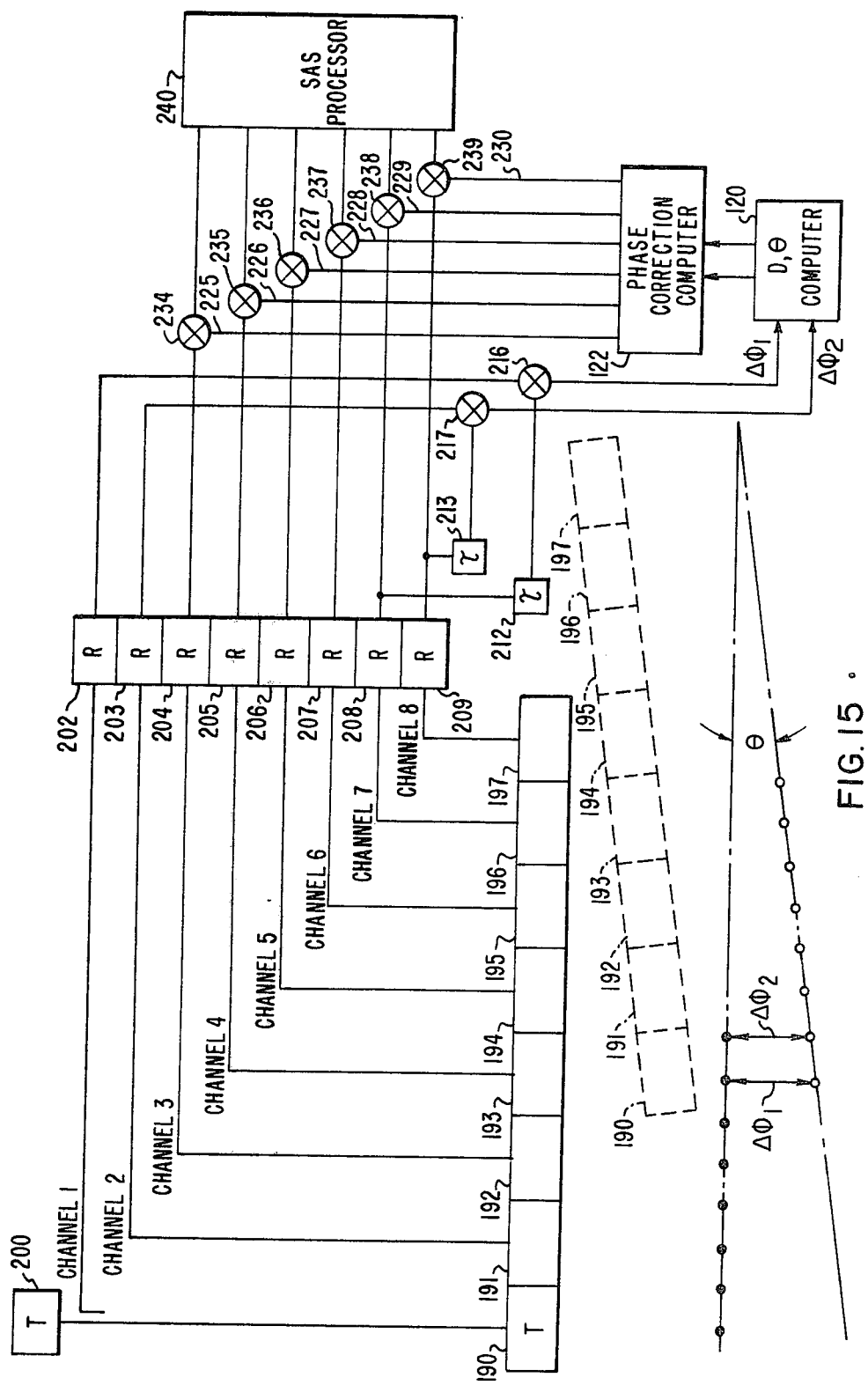
FIG. 15 is an embodiment of the present invention as applicable in a sonar system.

In the embodiment of the invention illustrated in FIG. 15, the plurality of elements 190 through 197 may represent the individual transducer active elements of a synthetic aperture sonar system. Element 190 connected to transmitter 200 is chosen for transmission, and the return signals are processed in respective channels including receivers 202 through 209.

The interpulse period is such that the transducer takes up a position from one pulse to the next which overlaps the array by more than half. For example, and as shown by the dotted position of the array, the eight element array is translated by three elements or one less than half the array length. This design provides for a two sample overlap in the equivalent spatial sample locations, that is the last two locations from the first pulse and the first two locations from the subsequent pulse.

If the array contains n elements, then in general the lateral displacement D of the array center and angular deviation $\theta$ are given by the equations:

$$D = \frac{[(n-1)\Delta\phi_2 - (n-2)\Delta\phi_1]\lambda}{4\pi} \quad (5)$$

$$\theta = \frac{(\Delta\phi_2 - \Delta\phi_1)\lambda 2n}{4\pi L} \quad (6)$$

The values of $\Delta\phi_1$ and $\Delta\phi_2$ are obtained by synchronous detection of the signals in channels 7 and 8 delayed by the signals in channels 1 and 2 respectively. Accordingly, there is provided delay circuits 212 and 213 connected to the output of receivers 208 and 209 and arranged to provide the delayed signal to respective synchronous demodulators 216 and 217 which respectively receive the channel 1 and 2 signals. The outputs of the synchronous demodulators therefore, as previously explained, will be the $\Delta\phi_1$ and $\Delta\phi_2$ values. These two signal values are provided to computer 120 which operates to solve for lateral displacement and angular deviation in accordance with equations (5) and (6). The values of D and $\theta$ are then provided to computer 122 which is operable to provide on respective output lines 225 to 230, a phase correction signal. This phase correction signal $\Delta\hat{\phi}_k$ is determined from the values of D and $\theta$ in accordance with the following equation:

$$\Delta\hat{\phi}_k = \frac{4\pi}{\lambda}\left[D - (1 - \frac{k}{n})\sin\theta\right] \quad (7)$$

where k is a particular line number and n is the total number of elements in the array.

The phase correction signals on lines 225 to 230 are phase corrections for sample locations 3 through 8 and accordingly phase modulate or shift the data in channels 3 through 8, from respective receivers 204 through 209, in respective phase shifters or modulators 234 through 239. The corrected data are then processed by the synthetic aperture processor 240.

Figure 16:
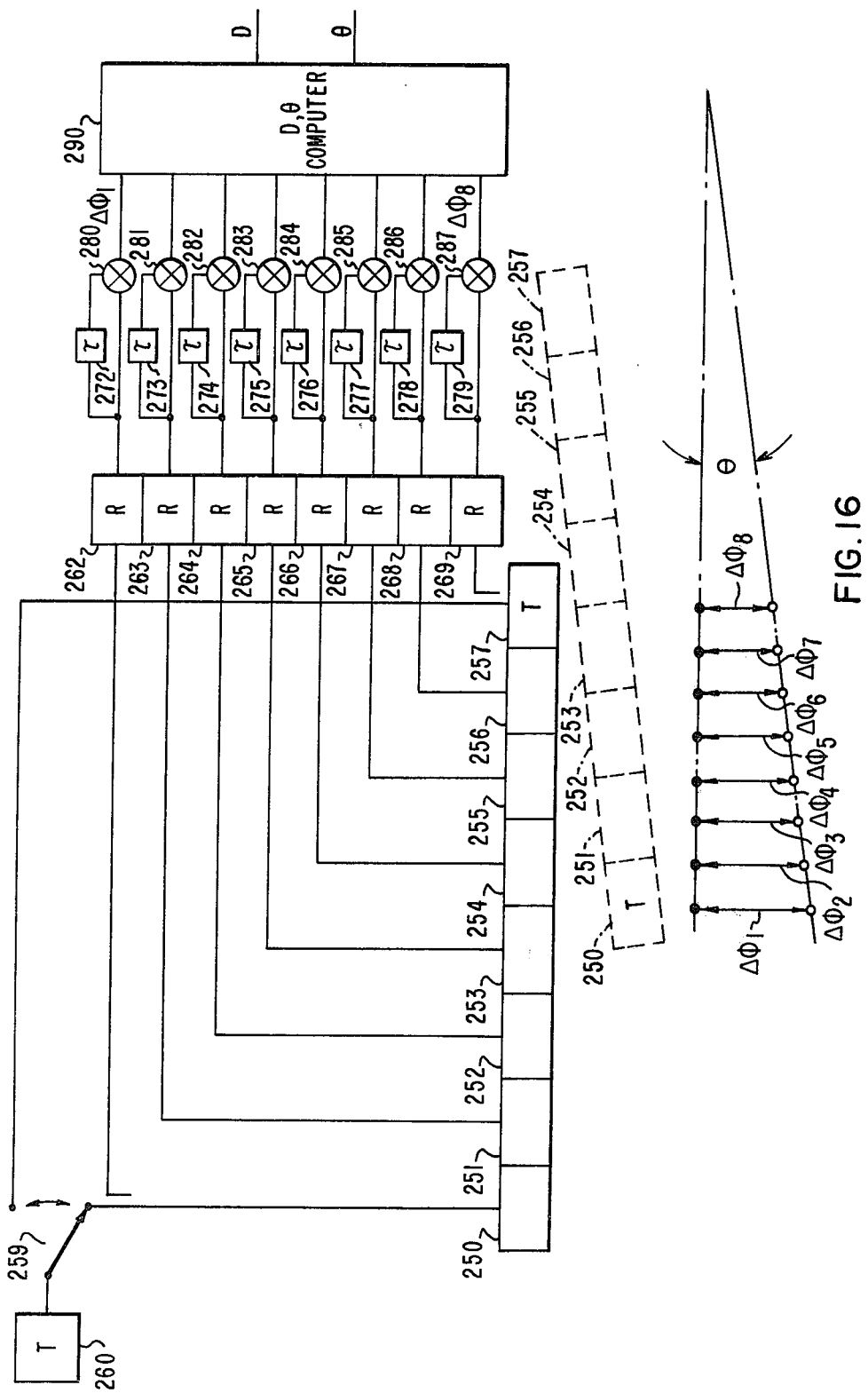
FIG. 16 is another embodiment of the present invention.

FIG. 16 illustrates an array similar to that in FIG. 15, however with the arrangement being such that all of the spatial samples of a first pulse are compared with all of the spatial samples from a subsequent pulse to increase sensitivity and provide for more accurate computations. The arrangement is applicable in most situations where comparisons are made for every two pulses but not the third, as was the case with respect to the embodiments shown in FIGS. 11 and 14.

The array is shown by way of example with eight elements 250 through 257 with the end elements 250 and 257 being designed for transmitting by means of the switch 259 and transmitter 260. As before, the plurality of channels include receivers 262 through 269 connected to receive the outputs of the respective elements 250 through 257. The phase differences between the spatial samples on the two pulses as designated $\Delta\phi_1$ through $\Delta\phi_8$, respectively, and these values are obtained, as before, with the provision of respective one pulse delay circuits 272 through 279 for channels 1 through 8 in conjunction with synchronous demodulators 280 through 287. Computer 290 is operable in response to the $\Delta\phi_1$ through $\Delta\phi_8$ signals to provide lateral and angular correction signals in accordance with equations (8) and (9), for example.

$$D = \frac{\lambda}{4\pi} \cdot \frac{6}{n(n+1)} \sum_{k=1}^{n}\left[k - \frac{(n+1)}{3}\right]\Delta\phi_k \quad (8)$$

$$\theta = \frac{\lambda}{4\pi L} \cdot \frac{24}{(n^2-1)} \sum_{k=1}^{n}\left[k - \frac{(n+1)}{2}\right] \quad (9)$$

In all of the embodiments illustrated, deviations were assumed to be in a single plane and corrections were made in that plane. It is to be understood that corrections at multiple elevation angles and ranges may be obtained by paralleling the elements indicated thus allowing independent corrections to be made at all, or chosen ones, of the range elements.

In the various embodiments corrections were obtained by comparison of at least two spatial samples from adjacent transmissions. The comparison allows generation of a displacement correction signal and an angular deviation correction signal for a conventional synthetic aperture or moving target indication system which normally is provided with correction signals from inertial navigational instrumentation. The exact method of signal modification would be well known to those skilled in the art, and FIG. 15 illustrated one possible implementation.

What is claimed is:
1. Data correction apparatus for sensor systems adapted to travel over a target area, on a carrier vehicle, comprising:
(a) an array of linearly arranged active elements, at least one of which is adapted to both transmit and receive energy;
(b) means for periodically transmitting energy from said one element toward said target area during travel of said carrier and for receiving energy returns on all said elements to derive, as a result of each said transmission at least two signals corresponding to two spatial sample locations along the path of said travel;

(c) said signals from one transmission nominally corresponding to the same spatial location as said signals from a subsequent transmission, but subject to relative lateral and angular deviation; and (d) means for comparing said two signals from said one transmission with said two signals from said subsequent transmission to generate at least one correction signal.

2. Apparatus according to claim 1, wherein said means for comparing includes:

(a) circuit means responsive to said comparison for generating a first signal proportional to lateral deviation of said array from a prescribed path of travel and a second signal proportional to angular deviation of said array relative to a prescribed orientation.

3. Apparatus according to claim 2 which includes (a) circuit means responsive to said first and second signals for generating a plurality of signals and for applying said plurality of signals to respective signals provided by said elements in response to said energy returns to modify same.

4. Apparatus according to claim 1 wherein:

(a) said detection system is a moving target detection system; and wherein (b) said means for transmitting and receiving derives at least three signals corresponding to three spatial sample locations along said path;

(c) said means for comparing being operable to compare at least one of said three signals from one transmission with one of said three signals from the subsequent transmission to generate an output signal indicative of the difference between said compared signals, said difference being indicative of target movement.

5. Apparatus according to claim 4 wherein:

(a) said array is comprised of four of said active elements.

6. Apparatus according to claim 4 wherein:

(a) said array is comprised of three of said active elements.

7. Apparatus according to claim 6 wherein:

(a) the middle one of said three active elements is adapted to transmit a pulse of energy on a first transmission; and (b) an end one of said three active elements is adapted to transmit a pulse of energy on the subsequent transmission.

8. Apparatus according to claim 1 wherein:

(a) said detection system is an acoustic synthetic aperture sonar system; and wherein (b) an end element of said array is adapted to transmit acoustic energy;

(c) said array being of length L and said subsequent transmission being made when said array has traveled L/2 from said first transmission;

(d) said means for transmitting and receiving derives a number of spatial samples equal to the number of said active elements;

(e) the last two spatial sample signals of said one transmission being compared with the first two spatial sample signals of said subsequent transmission.

9. Apparatus according to claim 1 wherein:

(a) said detection system is an acoustic synthetic aperture sonar system; and wherein (b) two end ones of said active elements are alternately adapted to transmit acoustic energy on alternate transmissions;

(c) said array being of length L and said subsequent transmission being made when said array has traveled L/2 from said first transmission;

(d) said means for transmitting and receiving derives a number of spatial samples equal to the number of said active elements;

(e) all spatial sample signals of said one transmission being compared with all spatial sample signals of said subsequent transmission.

* * * * *